(12) United States Patent
Soucy et al.

(10) Patent No.: US 8,872,889 B2
(45) Date of Patent: Oct. 28, 2014

(54) SYNCHRONIZATION OF THE ORIENTATION OF A 3D MEASUREMENT DEVICE AND THE ORIENTATION OF AN INTELLIGENT GUIDANCE DEVICE

(75) Inventors: Marc Soucy, Quebec (CA); Hans-Peter Duwe, Lindau (DE)

(73) Assignee: Innovmetric Logiciels Inc., Quebec (CA)

(*) Notice: Subject to any disclaimer, the term of this patent is extended or adjusted under 35 U.S.C. 154(b) by 1036 days.

(21) Appl. No.: 12/687,820

(22) Filed: Jan. 14, 2010

(65) Prior Publication Data

US 2011/0169925 A1 Jul. 14, 2011

(51) Int. Cl.
*H04N 15/00* (2006.01)
*G01C 21/20* (2006.01)

(52) U.S. Cl.
CPC ...................................... *G01C 21/20* (2013.01)
USPC ........................................................... 348/42

(58) Field of Classification Search
CPC ........ G01C 11/02; G01C 11/00; G01C 17/38; G01C 21/00; G01C 21/16; G01C 21/20; G06T 2207/30244; G06T 19/006; G06T 7/0024
USPC ........................................ 348/42; 700/1–306
See application file for complete search history.

(56) References Cited

U.S. PATENT DOCUMENTS

| | | | |
|---|---|---|---|
| 5,440,392 A | 8/1995 | Pettersen et al. | |
| 5,529,042 A | 6/1996 | Augustin et al. | |
| 5,856,844 A | 1/1999 | Batterman et al. | |
| 6,083,353 A * | 7/2000 | Alexander, Jr. | 202/158 |
| 6,175,647 B1 | 1/2001 | Schick et al. | |
| 6,236,896 B1 * | 5/2001 | Watanabe et al. | 700/37 |
| 6,587,601 B1 | 7/2003 | Hsu et al. | |
| 6,724,930 B1 | 4/2004 | Kosaka et al. | |
| 6,975,959 B2 | 12/2005 | Dietrich et al. | |
| 7,003,386 B1 * | 2/2006 | Ericsson et al. | 701/50 |
| 7,106,189 B2 * | 9/2006 | Burneske et al. | 340/539.13 |
| 7,307,655 B1 | 12/2007 | Okamoto et al. | |
| 7,557,736 B1 | 7/2009 | Daily et al. | |
| 2004/0051680 A1 | 3/2004 | Azuma et al. | |
| 2005/0018891 A1 | 1/2005 | Barfuss et al. | |
| 2006/0227211 A1 | 10/2006 | Kotake et al. | |
| 2008/0080789 A1 | 4/2008 | Marks et al. | |
| 2008/0177417 A1* | 7/2008 | Kasuga et al. | 700/213 |

(Continued)

FOREIGN PATENT DOCUMENTS

WO WO 98/10246 A1 3/1998

OTHER PUBLICATIONS

"Calibration of a Stereo System with Small Relative Angles" to Kamgar-Parsi et al. IEEE 1998.*

(Continued)

*Primary Examiner* — Mehrdad Dastouri
*Assistant Examiner* — Mohammed Rahaman
(74) *Attorney, Agent, or Firm* — Wolf, Greenfield & Sacks, P.C.

(57) ABSTRACT

There is described a method to synchronize the orientation of an IGD 3D Coordinate System and the orientation of a 3DM 3D Coordinate System, in which the IGD's gravity direction measurement device and electronic compass are used explicitly. There is also described how an IGD, once its orientation has been synchronized to the orientation of a 3DM, can be used to display 3D graphics that guide the measurement process.

16 Claims, 9 Drawing Sheets

(56) References Cited

U.S. PATENT DOCUMENTS

| | | | |
|---|---|---|---|
| 2008/0240616 A1 | 10/2008 | Haering et al. | |
| 2009/0088897 A1* | 4/2009 | Zhao et al. | 700/250 |
| 2009/0130642 A1 | 5/2009 | Tada et al. | |
| 2009/0239586 A1 | 9/2009 | Boeve et al. | |
| 2009/0254294 A1 | 10/2009 | Dutta et al. | |
| 2011/0054689 A1* | 3/2011 | Nielsen et al. | 700/258 |

OTHER PUBLICATIONS

Example of Experimental use of 3D Measurement system for construction robot based on component design concept, ISARC2006, Yamamoto.*

"Calibration, Registration, and Synchronization for High Precision Augmented Reality Haptics", Harders et al. Jan./Feb. 2009.*

European Search Report issued on Nov. 8, 2011 corresponding European Patent Application No. EP 10152002.

"Metrolog XG Pocket", [online], [retrieved on Nov. 4, 2009], retrieved from http://www.metrologic.fr/uk/XG-pocket.html.

"Portable Coordinate Measuring Machines", [online], [retrieved on Nov. 4, 2009], retrieved from: http://www.ndigital.com/industrial/index.php.

"MobiGage", [online], [retrieved on Jan. 6, 2010], retrieved from http://www.revware.net/mobigage.asp.

* cited by examiner

SYNCHRONIZATION OF THE ORIENTATION OF A 3D MEASUREMENT DEVICE AND THE ORIENTATION OF AN INTELLIGENT GUIDANCE DEVICE

CROSS-REFERENCE TO RELATED APPLICATIONS

This is the first application filed for the present invention.

TECHNICAL FIELD

The present invention relates to the field of the use of Intelligent Guidance Devices (IGD) for guiding measurement processes using 3D graphics.

BACKGROUND

A 3D Measurement Device (3DM) is a measurement system capable of measuring the (x, y, z) coordinates of points on physical parts in the 3-dimensional space, using anyone of many known measurement principles. These devices are used in many different manufacturing industries for quality assurance procedures.

In some instances, the devices are made to be portable such that they may be easier to handle and manipulate. However, since they have their own coordinate system, they are not necessarily compatible with other existing technologies. Images or measurements taken with these devices cannot easily be transferred to other imaging devices without losing some information attached to the coordinate system.

Therefore, there is a need to adapt 3D measurement devices to be used with other technologies.

SUMMARY

There is described herein a method to synchronize the orientation of an IGD 3D Coordinate System and the orientation of a 3DM 3D Coordinate System, in which the IGD's gravity direction measurement device and electronic compass are used explicitly. There is also described how an IGD, once its orientation has been synchronized to the orientation of a 3DM, can be used to display 3D graphics that guide the measurement process.

In accordance with a first broad aspect, there is provided a method for synchronizing a three-dimensional measurement device (3DM) having an internal 3D coordinate system $O_{3DM}$, $X_{3DM}$, $Y_{3DM}$, and $Z_{3DM}$, with an intelligent guidance device (IGD) having a display device, a gravity direction measurement device, an electronic compass, and an internal 3D coordinate system $O_{IGD}$, $X_{IGD}$, $Y_{IGD}$, $Z_{IGD}$, the method comprising: defining a coordinate system $O_{IGD\text{-}Earth}$, $X_{IGD\text{-}Earth}$, $Y_{IGD\text{-}Earth}$, $Z_{IGD\text{-}Earth}$ using a direction opposite to gravity as $Z_{IGD\text{-}Earth}$ and a direction corresponding to the magnetic north pole as $Y_{IGD\text{-}Earth}$, from a perspective of the IGD; computing and applying a rigid transformation $T_{IGD\text{-}To\text{-}IGDEarth}$ to transform $O_{IGD}$, $X_{IGD}$, $Y_{IGD}$, $Z_{IGD}$ to $O_{IGD\text{-}Earth}$, $X_{IGD\text{-}Earth}$, $Y_{IGD\text{-}Earth}$, $Z_{IGD\text{-}Earth}$; defining a coordinate system $O_{3DM\text{-}Earth}$, $X_{3DM\text{-}Earth}$, $Y_{3DM\text{-}Earth}$, $Z_{3DM\text{-}Earth}$ using a direction opposite to gravity as $Z_{3DM\text{-}Earth}$ and the direction corresponding to the magnetic north pole as $Y_{3DM\text{-}Earth}$, from a perspective of the 3DM; and computing and applying a rigid transformation $T_{3DM\text{-}To\text{-}3DMEarth}$ to transform $O_{3DM}$, $X_{3DM}$, $Y_{3DM}$, and $Z_{3DM}$ to $O_{3DM\text{-}Earth}$, $X_{3DM\text{-}Earth}$, $Y_{3DM\text{-}Earth}$, $Z_{3DM\text{-}Earth}$.

In accordance with a second broad aspect, there is provided a system for synchronizing a three-dimensional measurement device (3DM) having an internal 3D coordinate system $O_{3DM}$, $X_{3DM}$, $Y_{3DM}$, and $Z_{3DM}$, with an intelligent guidance device (IGD) having a display device, at gravity direction measurement device, an electronic compass, and an internal 3D coordinate system $O_{IGD}$, $X_{IGD}$, $X_{IGD}$, $Z_{IGD}$, the system comprising: an IGD transformation module operatively connected to the IGD and adapted to define a coordinate system $O_{IGD\text{-}Earth}$, $X_{IGD\text{-}Earth}$, $Y_{IGD\text{-}Earth}$, $Z_{IGD\text{-}Earth}$ using a direction opposite to gravity as $Z_{IGD\text{-}Earth}$ and a direction corresponding to the magnetic north pole as $Y_{IGD\text{-}Earth}$, from a perspective of the IGD, and compute and apply a rigid transformation $T_{IGD\text{-}To\text{-}IGDEarth}$ to transform $O_{IGD}$, $X_{IGD}$, $Y_{IGD}$, $Z_{IGD}$ to $O_{IGD\text{-}Earth}$, $X_{IGD\text{-}Earth}$, $Y_{IGD\text{-}Earth}$, $Z_{IGD\text{-}Earth}$; and a 3DM transformation module operatively connected to the 3DM and adapted to define a coordinate system $O_{3DM\text{-}Earth}$, $X_{3DM\text{-}Earth}$, $Y_{3DM\text{-}Earth}$, $Z_{3DM\text{-}Earth}$ using a direction opposite to gravity as $Z_{3DM\text{-}Earth}$ and the direction corresponding to the magnetic north pole as $Y_{3DM\text{-}Earth}$, from a perspective of the 3DM, compute and apply a rigid transformation $T_{3DM\text{-}To\text{-}3DMEarth}$ to transform $O_{3DM}$, $X_{3DM}$, $Y_{3DM}$, and $Z_{3DM}$ to $O_{3DM\text{-}Earth}$, $X_{3DM\text{-}Earth}$, $Y_{3DM\text{-}Earth}$, $Z_{3DM\text{-}Earth}$.

In accordance with a third broad aspect, there is provided an intelligent guidance device having an internal 3D coordinate system $O_{IGD}$, $X_{IGD}$, $Y_{IGD}$, $Z_{IGD}$, the device comprising: a gravity direction measurement device; an electronic compass; an IGD transformation module operatively connected to the IGD and adapted to define a coordinate system $O_{IGD\text{-}Earth}$, $X_{IGD\text{-}Earth}$, $Y_{IGD\text{-}Earth}$, $Z_{IGD\text{-}Earth}$ using a direction opposite to gravity as $Z_{IGD\text{-}Earth}$ and a direction corresponding to the magnetic north pole as $Y_{IGD\text{-}Earth}$, and to compute and apply a rigid transformation $T_{IGD\text{-}To\text{-}IGDEarth}$ to transform $O_{IGD}$, $X_{IGD}$, $Y_{IGD}$, $Z_{IGD}$ to $O_{IGD\text{-}Earth}$, $X_{IGD\text{-}Earth}$, $Y_{IGD\text{-}Earth}$, $Z_{IGD\text{-}Earth}$; and a display device for displaying 3D graphics in a 3D coordinate system synchronized with a 3D coordinate system of a three-dimensional measurement device.

In accordance with a fourth broad aspect, there is provided at least one computer program product for synchronizing a three-dimensional measurement device (3DM) having an internal 3D coordinate system $O_{3DM}$, $X_{3DM}$, $Y_{3DM}$, and $Z_{3DM}$, with an intelligent guidance device (IGD) having a display device, a gravity direction measurement device, an electronic compass, and an internal 3D coordinate system $O_{IGD}$, $X_{IGD}$, $Y_{IGD}$, $Z_{IGD}$, comprising instruction means encoded on a computer-readable medium, for causing operations of: defining a coordinate system $O_{IGD\text{-}Earth}$, $X_{IGD\text{-}Earth}$, $Y_{IGD\text{-}Earth}$, $Z_{IGD\text{-}Earth}$ using a direction opposite to gravity as $Z_{IGD\text{-}Earth}$ and a direction corresponding to the magnetic north pole as $Y_{IGD\text{-}Earth}$, from a perspective of the IGD; computing and applying a rigid transformation $T_{IGD\text{-}To\text{-}IGDEarth}$ to transform $O_{IGD}$, $X_{IGD}$, $Y_{IGD}$, $Z_{IGD}$ to $O_{IGD\text{-}Earth}$, $X_{IGD\text{-}Earth}$, $Y_{IGD\text{-}Earth}$, $Z_{IGD\text{-}Earth}$; defining a coordinate system $O_{3DM\text{-}Earth}$, $X_{3DM\text{-}Earth}$, $Y_{3DM\text{-}Earth}$, $Z_{3DM\text{-}Earth}$ using a direction opposite to gravity as $Z_{3DM\text{-}Earth}$ and the direction corresponding to the magnetic north pole as $Y_{3DM\text{-}Earth}$, from a perspective of the 3DM; and computing and applying a rigid transformation $T_{3DM\text{-}To\text{-}3DMEarth}$ to transform $O_{3DM}$, $X_{3DM}$, $Y_{3DM}$, and $Z_{3DM}$ to $O_{3DM\text{-}Earth}$, $X_{3DM\text{-}Earth}$, $Y_{3DM\text{-}Earth}$ $Z_{3DM\text{-}Earth}$.

In the present specification, the following definitions are to be used throughout.

3D Coordinate System: A system for assigning 3 numbers to each point in a 3-dimensional space. A common instance of a 3D Coordinate System is the Cartesian coordinate system where three X, Y, Z axes perpendicular to each other and meeting each other at an origin point (0, 0, 0) are used to parameterize the 3-dimensional space (see FIG. 1). An infinite number of 3D Coordinate Systems can be derived from the basic Cartesian coordinate system by moving (or translating) the origin point in 3-dimensional space, defining a new origin O', and rotating the original X, Y, Z axes to define new axes X', Y', and Z' (see FIG. 2). In such a case, the X', Y', and Z' axes can each be expressed by using a triplet of (x, y, z) coordinates, expressed in the Cartesian coordinate system. The triplet of (x, y, z) coordinates representing a particular axis is computed by determining a point P located at a distance of 1 from the origin O' along the direction of the axis, and then subtracting the origin O' from this point P.

A 3D Coordinate System is said to be right-handed if the vector product between the first axis (for example X) and the second axis (for example Y) produces the third axis (for example Z). A 3D Coordinate System would be left-handed if the vector product between the second axis and the first axis would produce the third axis. This document uses right-handed 3D Coordinate Systems in all explanations. However, left-handed 3D Coordinate Systems could be used as well without loss of generality.

3D Transformation: A mathematical operation that transforms any input point $(x_i, y_i, z_i)$ in 3-dimensional space into an output point $(x_o, y_o, z_o)$.

Rigid 3D Transformation: Rigid 3D Transformations are subsets of the possible 3D Transformations applicable to input points by which only rotations and translations are applied to these points. Such a 3D Transformation is called rigid because it preserves the original shape and dimensions of any 3-dimensional object. For example, let's imagine a box having a width of 1 meter, a height of 2 meters, and a depth of 3 meters. Then, let's consider any possible Rigid 3D Transformation that can be applied to this box. If any of these possible Rigid 3D Transformations are applied to the box, the box dimensions would always remain 1 meter by 2 meters by 3 meters under all circumstances.

A Rigid 3D Transformation RT can be expressed by six numbers $(r_x, r_y, r_z, t_x, t_y, t_z)$. The numbers $r_x$, $r_y$, and $r_z$ represent successive rotations to be applied about the X, Y, and Z axes of the Cartesian coordinate system. The numbers $t_x$, $t_y$, and $t_z$ represent successive translations to be applied along the X, Y, and Z axes of the Cartesian coordinate system. There are various mathematical techniques available to represent Rigid 3D Transformation using 4 by 4 matrices and to extract the three rotations and three translations from a 4 by 4 Rigid 3D Transformation matrix.

In addition to being applicable to points, Rigid 3D Transformations can also be applied to 3D Coordinate Systems. Four points are needed to define an arbitrary 3D Coordinate System: the origin O', and the points at a unitary distance of 1 from O' along the X', Y', and Z' axes. A Rigid 3D Transformation is applied to a 3D Coordinate System by transforming the four points that are needed to describe it. The origin and three axes of the transformed 3D Coordinate System may then be rebuilt from the four transformed points by subtracting the transformed origin from the three transformed points at the extremity of the unitary axes (see FIG. 3).

Gravity Direction Measurement Device: A measurement device that is capable of measuring the direction of gravity, such as a three-axis accelerometer or an inclinometer. Gravity direction measurement devices can be incorporated in computing devices. If the computing device is not moved abruptly, the gravitational force becomes the only major force influencing the gravity direction measurement device readings. The gravitational force generally points towards the center of Earth with a relatively stable intensity locally.

Electronic Compass: A measurement device that can determine the direction of the Earth's North magnetic pole. An electronic compass can be incorporated in computing devices. Locally, the measurements produced by an electronic compass are fairly constant. The North direction can be used not only for geographical navigation purposes, but also as a fixed reference direction to define a coordinate system.

Display Device: A material support to visually output information to an end-user, such as text, images, videos, etc. Computing devices are generally equipped with display devices.

Intelligent Guidance Device (IGD): A computing device equipped with a display device, gravity direction measurement device, and electronic compass. An example of an IGD is the iPhone™ 3GS model.

3D Measurement Device (3DM): A measurement system capable of measuring the (x, y, z) coordinates of points on physical parts in the 3-dimensional space. Any measurement principle can be used.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

A 3DM is a device designed to measure the (x, y, z) coordinates of points and report these measured coordinates from the perspective of its internal 3D Coordinate System defined by an origin $O_{3DM}$ and three axes $X_{3DM}$, $Y_{3DM}$, and $Z_{3DM}$. An IGD is a device that also has an internal 3D Coordinate System defined by an origin $O_{IGD}$ and three axes $X_{IGD}$, $Y_{IGD}$, $Z_{IGD}$.

Figure 1:
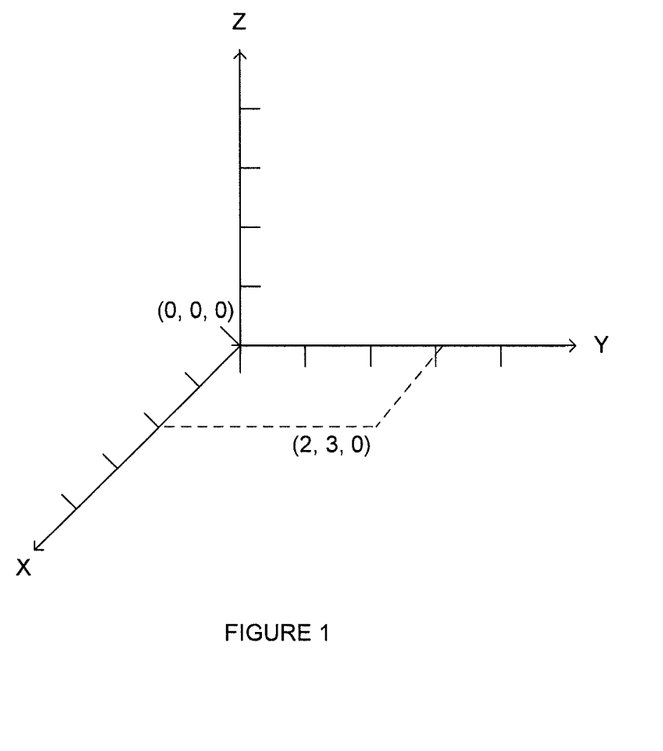
FIG. 1 illustrates a Cartesian coordinate system with a point parametrized in a 3-dimensional space, in accordance with one embodiment.
Figure 2:
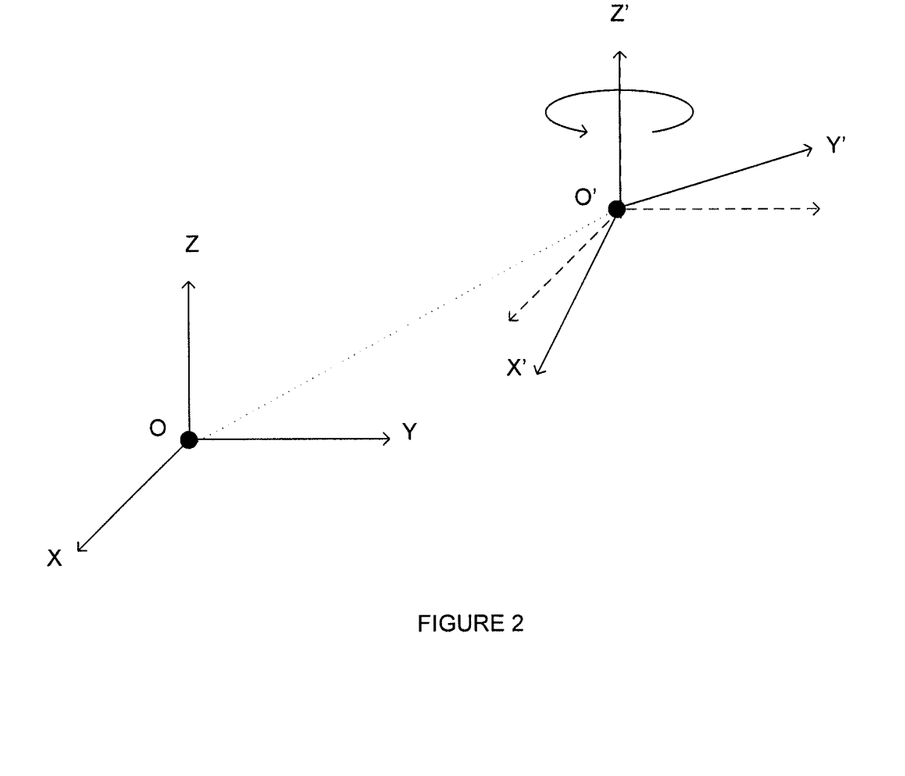
FIG. 2 illustrates the Cartesian coordinate system of FIG. 1 and a second 3D coordinate system defined by translating and rotating the Cartesian coordinate system, in accordance with one embodiment.
Figure 3:
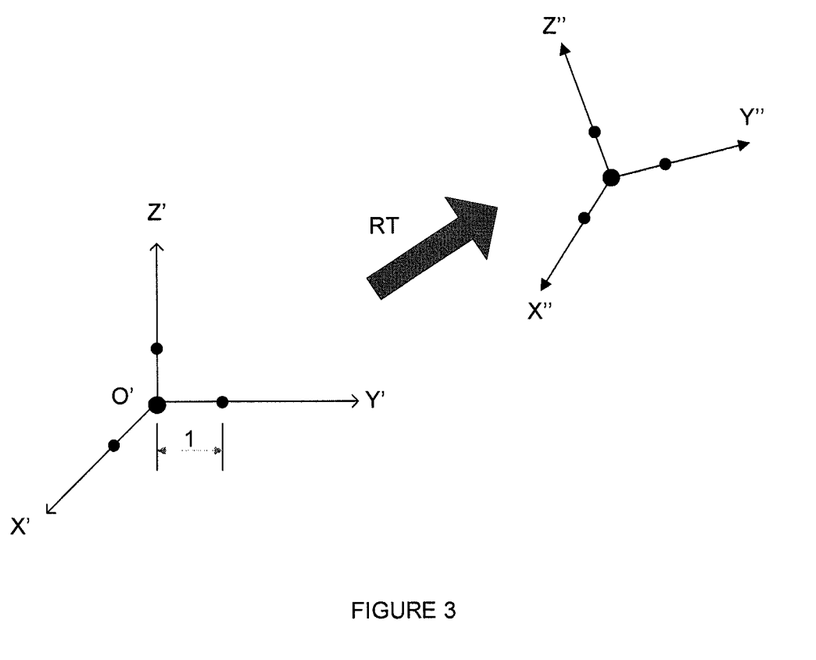
FIG. 3 illustrates how a 3D coordinate system is transformed by a Rigid 3D Transformation, in accordance with one embodiment.

FIG. 1 illustrates a Cartesian coordinate system having axes X, Y, and Z and an origin (0, 0, 0). A point (2, 3, 0) is parametrized in the 3-dimensional space. FIG. 2 illustrates a new coordinate system defined by translating and rotating the Cartesian coordinate system of FIG. 1. This new coordinate system has axes X', Y', Z'. In FIG. 3, the coordinate system defined by X', Y', Z' is further transformed by rigid 3D transformation RT by transforming four points and recomputing the axes such that we have X", Y", Z". These principles are used in order to synchronize the orientation of a 3DM 3D Coordinate System with the orientation of a IGD 3D Coordinate System.

Using the gravity direction measurement device of the IGD, the direction of gravity is measured and a vector $Z_{IGD-Earth}$ pointing in a direction opposite to gravity (up) is determined. Using the electronic compass of the IGD, the direction of the North magnetic pole is measured and a vector $Y_{IGD-Earth}$ pointing in the North direction is determined.

Since the $Z_{IGD-Earth}$ and $Y_{IGD-Earth}$ axes are computed from separate measurement devices, they are not perfectly perpendicular to each other. An adjustment operation is used to make them perpendicular to each other. A plane formed by $Z_{IGD-Earth}$ and $Y_{IGD-Earth}$ is defined. One of the two axes, for example $Z_{IGD-Earth}$, is fixed. The adjusted axis, for example $Y_{IGD-Earth}$, is then rotated in the plane to make it perpendicular to the fixed axis. There are two positive rotation angles below or equal to 180 degrees that make the adjusted axis perpendicular to the fixed axis. The one closest to 0 is used. Alternately, the $Y_{IGD-Earth}$ could be used as the fixed axis, and the $Z_{IGD-Earth}$ axis could be rotated to make it perpendicular to $Y_{IGD-Earth}$ using the same method.

Figure 4A:
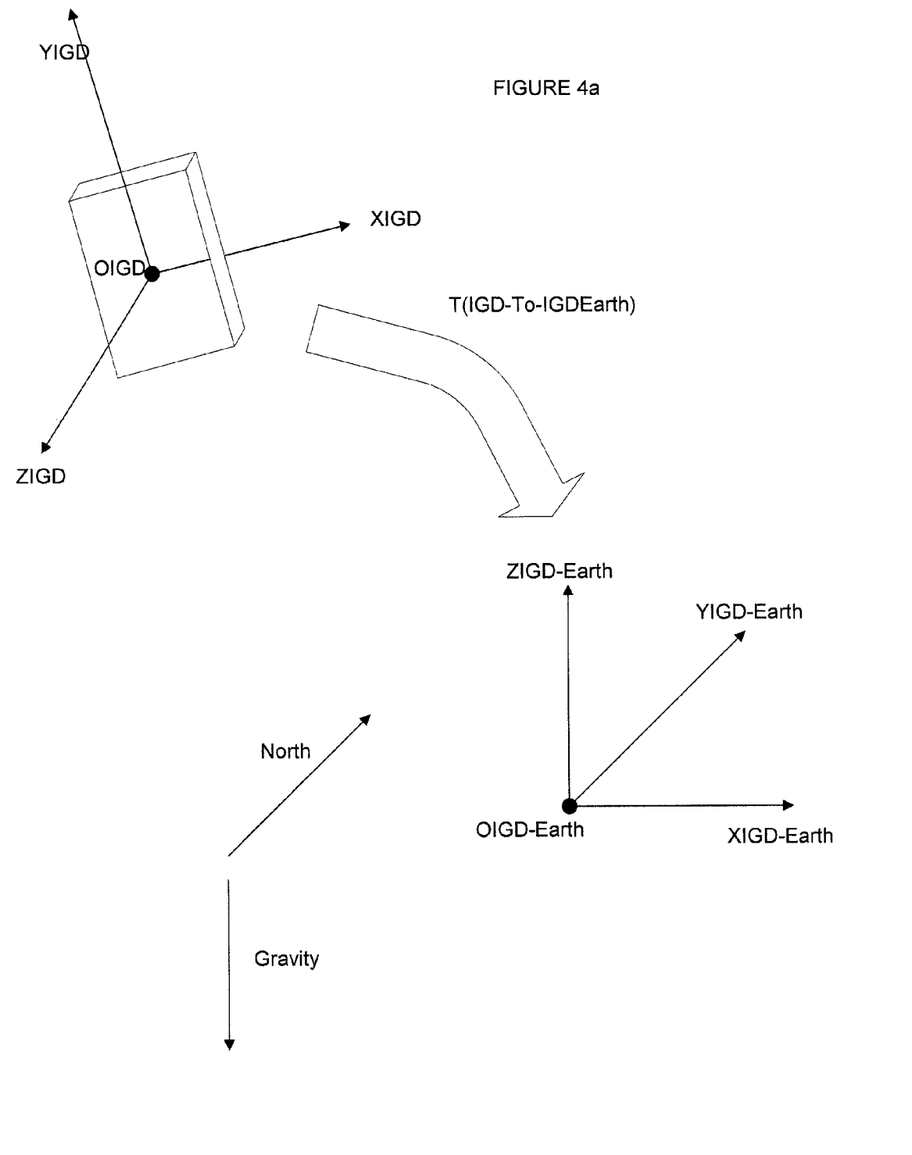
FIG. 4a illustrates the transformation of an IGD 3D coordinate system to orient it with respect to gravity and the North direction, in accordance with one embodiment.
Figure 4B:
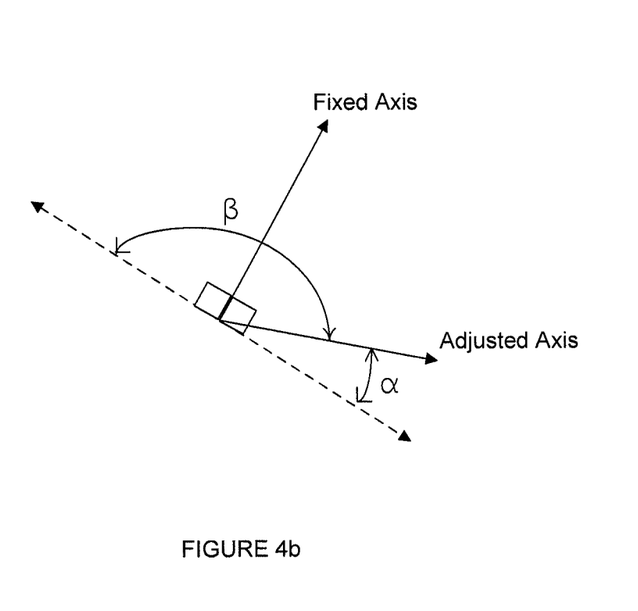
FIG. 4b illustrates the axis adjustment operation, in accordance with one embodiment.

The adjustment operation is illustrated in FIG. 4b. In the plane formed by the fixed axis and the adjusted axis, two positive rotation angles α and β less than or equal to 180° can be applied to the adjusted axis to make it perpendicular to the fixed axis. The smallest of α and β is used.

A vector $X_{IGD-Earth}$ is found by computing the vector product between $Y_{IGD-Earth}$ and $Z_{IGD-Earth}$. An arbitrary origin $O_{IGD-Earth}$ is defined at (0, 0, 0). $O_{IGD-Earth}$, $X_{IGD-Earth}$, $Y_{IGD-Earth}$, $Z_{IGD-Earth}$ represent a 3D Coordinate System where one of the axes points in a direction opposite to gravity and the other points towards North.

A Rigid 3D Transformation $T_{IGD-To-IGDEarth}$ is computed to transform the IGD internal 3D Coordinate System $O_{IGD}$, $X_{IGD}$, $Y_{IGD}$, $Z_{IGD}$ into the 3D Coordinate System $O_{IGD-Earth}$, $X_{IGD-Earth}$, $Y_{IGD-Earth}$, $Z_{IGD-Earth}$, as illustrated in FIG. 4a.

The direction of gravity is measured from the standpoint of the 3DM 3D Coordinate System. Any method known to the person skilled in the art may be used. For example, adjust a flat physical part using a level to bring its flat section perpendicular to gravity, measure the flat section with the 3DM, fit a plane on the measured points, and use the plane's normal vector to determine the direction of gravity. Alternatively, a gravity direction measurement device integrated to the 3DM may be used to determine the direction of gravity.

From the gravity vector measured from the standpoint of the 3DM 3D Coordinate System, a vector $Z_{3DM-Earth}$ pointing in a direction opposite to gravity (up) may be determined. The direction of the North magnetic pole is measured from the standpoint of the 3DM 3D Coordinate System. Any method known to a person skilled in the art may be used. For example, use an electronic compass integrated to the 3DM, display the North direction on the IGD display device and use the 3DM to measure the displayed direction, or use a standard compass and use the 3DM to measure the direction indicated by the standard compass.

From the North direction measured from the standpoint of the 3DM 3D Coordinate System, a vector Y 3DM-Earth pointing in the North direction may be determined. A plane formed by $Z_{3DM-Earth}$ and $Y_{3DM-Earth}$ is then defined. If $Y_{3DM-Earth}$ is not perfectly perpendicular to $Z_{3DM-Earth}$, either one of $Z_{3DM-Earth}$ or $Y_{3DM-Earth}$ may be rotated in the plane to bring the two perfectly perpendicular. Two positive rotation angles are possible, the smallest is used.

A vector $X_{3DM-Earth}$ is determined by computing the vector product between $Y_{3DM-Earth}$ and $Z_{3DM-Earth}$. An origin $O_{3DM-Earth}$ is defined at (0, 0, 0). $O_{3DM-Earth}$, $X_{3DM-Earth}$, $Y_{3DM-Earth}$, $Z_{3DM-Earth}$ represent a 3D Coordinate System where one of the axes points in a direction opposite to gravity and the other points towards North.

Figure 5:
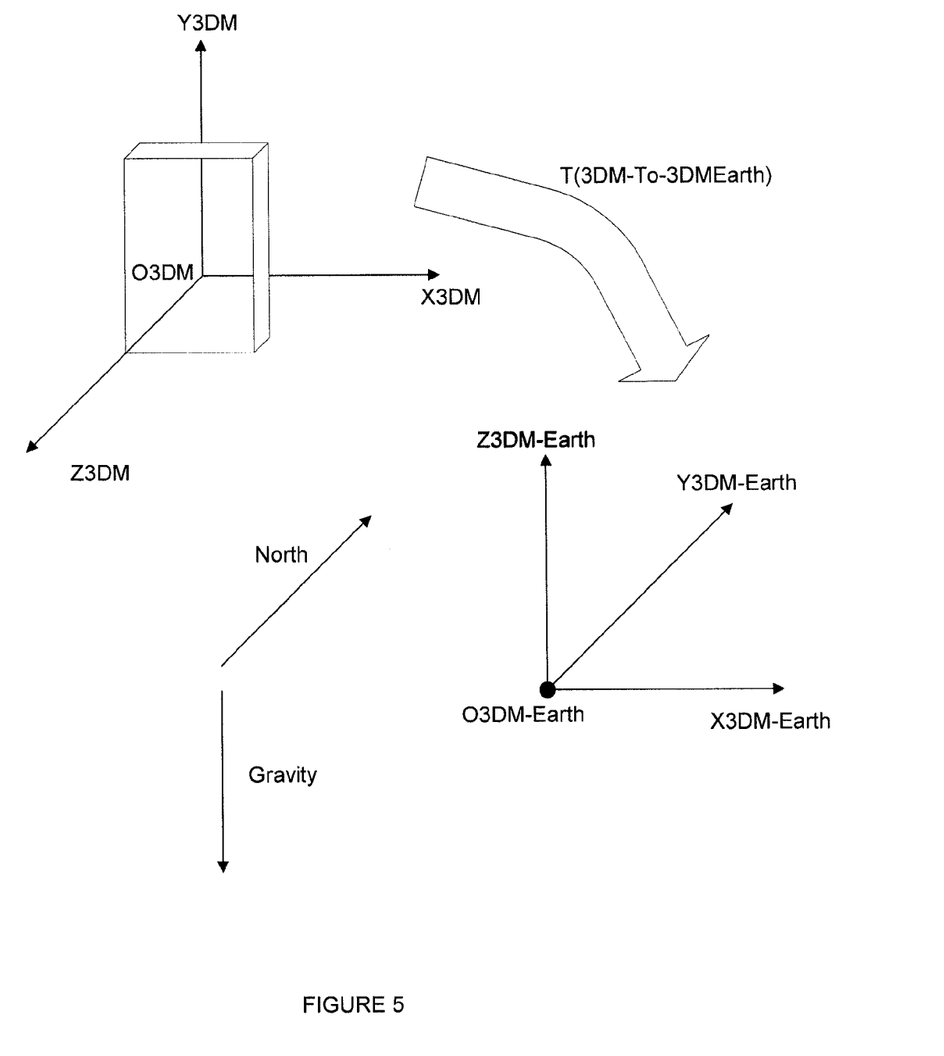
FIG. 5 illustrates the transformation of a 3DM 3D coordinate system to orient it with respect to gravity and the North direction, in accordance with one embodiment.

A Rigid 3D Transformation $T_{3DM-To-3DMEarth}$ is computed and it brings the 3DM internal 3D Coordinate System $O_{3DM}$, $X_{3DM}$, $Y_{3DM}$, $Z_{3DM}$ in total correspondence with 3D Coordinate System $O_{3DM-Earth}$, $X_{3DM-Earth}$, $Y_{3DM-Earth}$, $Z_{3DM-Earth}$, as illustrated in FIG. 5.

The orientation of the IGD and the orientation of the 3DM are synchronized by transforming the internal 3D Coordinate System of the IGD by Rigid 3D Transformation $T_{IGD-To-IGDEarth}$ and transforming the internal 3D Coordinate System of the 3DM by Rigid 3D Transformation $T_{3DM-To-3DMEarth}$. The orientation of the IGD and the orientation of the 3DM are synchronized since the transformed $X_{IGD}$ and $X_{3DM}$ axes are parallel to each other and point in the same direction, the transformed $Y_{IGD}$ and $Y_{3DM}$ axes are parallel to each other and point in the same direction, and the transformed $Z_{IGD}$ and $Z_{3DM}$ axes are parallel to each other and point in the same direction.

Once the orientation of the IGD and the orientation of the 3DM are synchronized, the synchronization should be maintained at all times. Two cases may need to be specifically addressed.

The first case is related to the nature of a typical IGD, which is that it is hand-held and can be rotated freely. Therefore, changes in the orientation of the IGD are to be monitored. If a change in the orientation of the IGD is detected, the Rigid 3D Transformation $T_{IGD-To-IGDEarth}$ should be updated by re-measuring the directions of gravity and North magnetic pole using the IGD gravity direction measurement device and electronic compass, and then updating the Rigid 3D Transformation $T_{IGD-To-IGDEarth}$.

In addition, measurement processes generally require the transformation of the 3DM 3D Coordinate System into other 3D Coordinate Systems, typically ones created in Computer-Aided Design (CAD) software. To maintain the synchronization of the orientation of the IGD and the orientation of the 3DM, the invert of the Rigid 3D Transformation $T_{3DM-To-3DMEarth}$ should be applied to both the 3D Coordinate System $O_{IGD-Earth}$, $X_{IGD-Earth}$, $Y_{IGD-Earth}$, $Z_{IGD-Earth}$ and the 3D Coordinate System $O_{3DM-Earth}$, $X_{3DM-Earth}$, $Y_{3DM-Earth}$, $Z_{3DM-Earth}$. This operation transforms the IGD 3D Coordinate System into the internal 3DM 3D Coordinate System, while keeping the orientations synchronized. Then, an operator can determine a Rigid 3D Transformation transforming the internal 3DM 3D Coordinate System into the 3D Coordinate System of a model designed in CAD (Computer-Aided Design) software. This Rigid 3D Transformation would then be applied to both IGD and 3DM 3D Coordinate Systems in order to maintain their orientation synchronized. After the operation is applied, the axes of the transformed IGD 3D Coordinate System have the same orientation as the CAD model axes.

Once the orientation of the IGD and the orientation of the 3DM are synchronized, the IGD can be used to guide a measurement process by means of 3D graphics displayed on the IGD display device. The following methodology demonstrates measurement guidance by means of 3D graphics.

First, the orientation of the IGD and the orientation of the 3DM 3D Coordinate Systems are synchronized, as described above. Then, the 3DM 3D Coordinate System is usually transformed to bring it into a more useful position and orientation. For example, points are measured on a physical part or assembly, and these measured points are used to construct a transformation that transforms the 3DM 3D Coordinate System into a CAD 3D Coordinate System. Since synchronization is achieved and maintained, the IGD 3D Coordinate System is also transformed, and the IGD 3D Coordinate System axes will have the same orientation and direction compared to the corresponding CAD 3D Coordinate System axes.

Since the axes of the CAD, 3DM, and IGD 3D Coordinate Systems all have the same orientation and direction, it becomes possible to use the IGD display device to display 3D graphics of the CAD model and ensure that these 3D graphics have the same orientation as the CAD 3D Coordinate System. In the above example, 3D graphics to be displayed on the IGD are determined by geometry defined in the CAD 3D Coordinate System. In order to produce 3D graphics of this geometry and display these 3D graphics on the IGD display device, the following Rigid 3D Transformations are applied successively to this geometry: the invert of the 3DM-to-CAD Rigid 3D Transformation; $T_{3DM\text{-}To\text{-}3DMEarth}$; the invert of $T_{IGD\text{-}To\text{-}IGDEarth}$.

If the operator needs to measure a specific section of the CAD model during a measurement routine, the IGD display device may be used to display the specific section using 3D graphics. Guidance 3D graphics such as 3D arrows and 3D text annotations can be used to supply information to the operator and guide the measurement process. For example, if a given target point needs to be measured, 3D arrows indicating the current distance between the 3DM and the target point along the three axes can be displayed on the IGD display device. Because the 3D arrows are oriented along the axes of the physical part or assembly, they help the operator reaching the target position more quickly.

Figure 6:
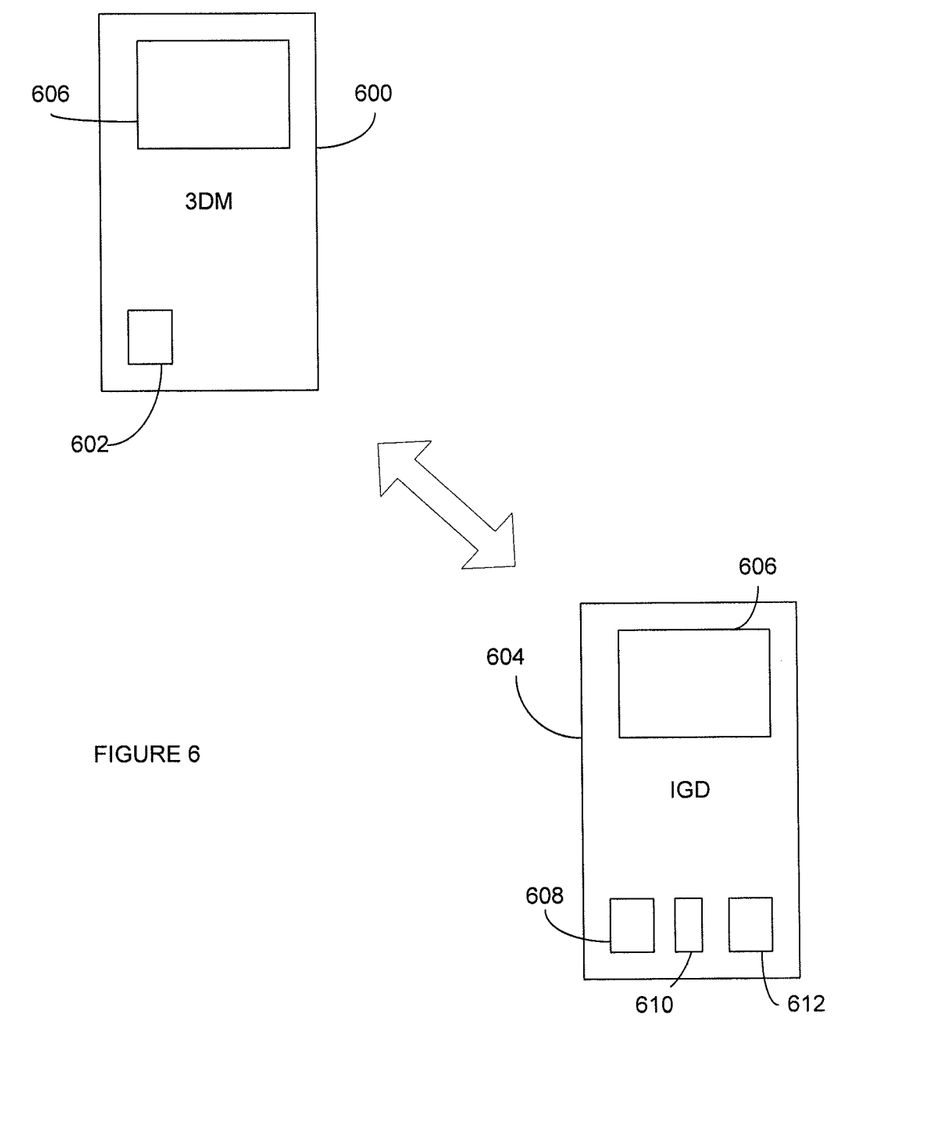
FIG. 6 is a block diagram of a system for synchronizing a 3DM and an IGD where the transformation modules are integrated onto the respective devices, in accordance with one embodiment.

FIG. 6 illustrates an embodiment for a system for synchronizing the internal coordinate systems of a 3DM 600 and an IGD 604 in order to allow measurement guidance using the IGD 604. In this embodiment, the 3DM 600 includes a display device 606 and a 3DM transformation module 602 is integrated inside the 3DM 600. The 3DM transformation module 602 is a software product adapted to define the coordinate system $O_{3DM\text{-}Earth}$, $X_{3DM\text{-}Earth}$, $Y_{3DM\text{-}Earth}$, $Z_{3DM\text{-}Earth}$ using the direction opposite to gravity as $Z_{3DM\text{-}Earth}$ and the direction corresponding to the magnetic north pole as $Y_{3DM\text{-}Earth}$, from the perspective of the 3DM. The 3DM transformation module 602 will then compute the rigid transformation $T_{3DM\text{-}To\text{-}3DMEarth}$ to transform $O_{3DM}$, $X_{3DM}$, $Y_{3DM}$, and $Z_{3DM}$ to $O_{3DM\text{-}Earth}$, $X_{3DM\text{-}Earth}$, $Y_{3DM\text{-}Earth}$, $Z_{3DM\text{-}Earth}$. This rigid transformation can then be applied to the internal coordinate system of the 3DM 600.

FIG. 6 also illustrates the IGD 604 with which the 3DM 600 is being synchronized. In the embodiment illustrated, the IGD 604 also has a display device 606. A gravity direction measurement device 608 and an electronic compass 612 are integrated inside the IGD 604. Also integrated is an IGD transformation module 610, which is a software product adapted to define the coordinate system $O_{IGD\text{-}Earth}$, $X_{IGD\text{-}Earth}$, $Y_{IGD\text{-}Earth}$, $Z_{IGD\text{-}Earth}$ using the direction opposite to gravity as $Z_{IGD\text{-}Earth}$ and the direction corresponding to the magnetic north pole as $Y_{IGD\text{-}Earth}$, from the perspective of the IGD 604. The IGD 604 computes and applies a rigid transformation $T_{IGD\text{-}To\text{-}IGDEarth}$ to transform $O_{IGD}$, $X_{IGD}$, $Y_{IGD}$, $Z_{IGD}$ to $O_{IGD\text{-}Earth}$, $X_{IGD\text{-}Earth}$, $Y_{IGD\text{-}Earth}$, $Z_{IGD\text{-}Earth}$.

In the embodiment of FIG. 6, a specially adapted 3DM 600 and a specially adapted IGD 604 are sufficient to perform the above-described synchronization and allow the IGD 604 to be used to display 3D graphics in a known direction and orientation. The IGD transformation module 610 and the 3DM transformation module 602 can be downloaded onto the respective devices via the internet or transferred from a storage medium such as a USB key, a scandisk, or any other type of memory device. The transfer of the software program onto the devices may be done in a wireless manner or a connected manner using one or more wires or cables. The modules 602, 610 may also be provided on the devices at the time of fabrication or manufacturing. The IGD 604 and the 3DM 600 may also be in communication together to transfer 3D images from one device to the other. This communication may be done in a wireless manner, such as Radio Frequency, WiFi, infrared, microwaves, etc. This communication may also be done in a connected manner using one or more wires or cables.

Figure 7:
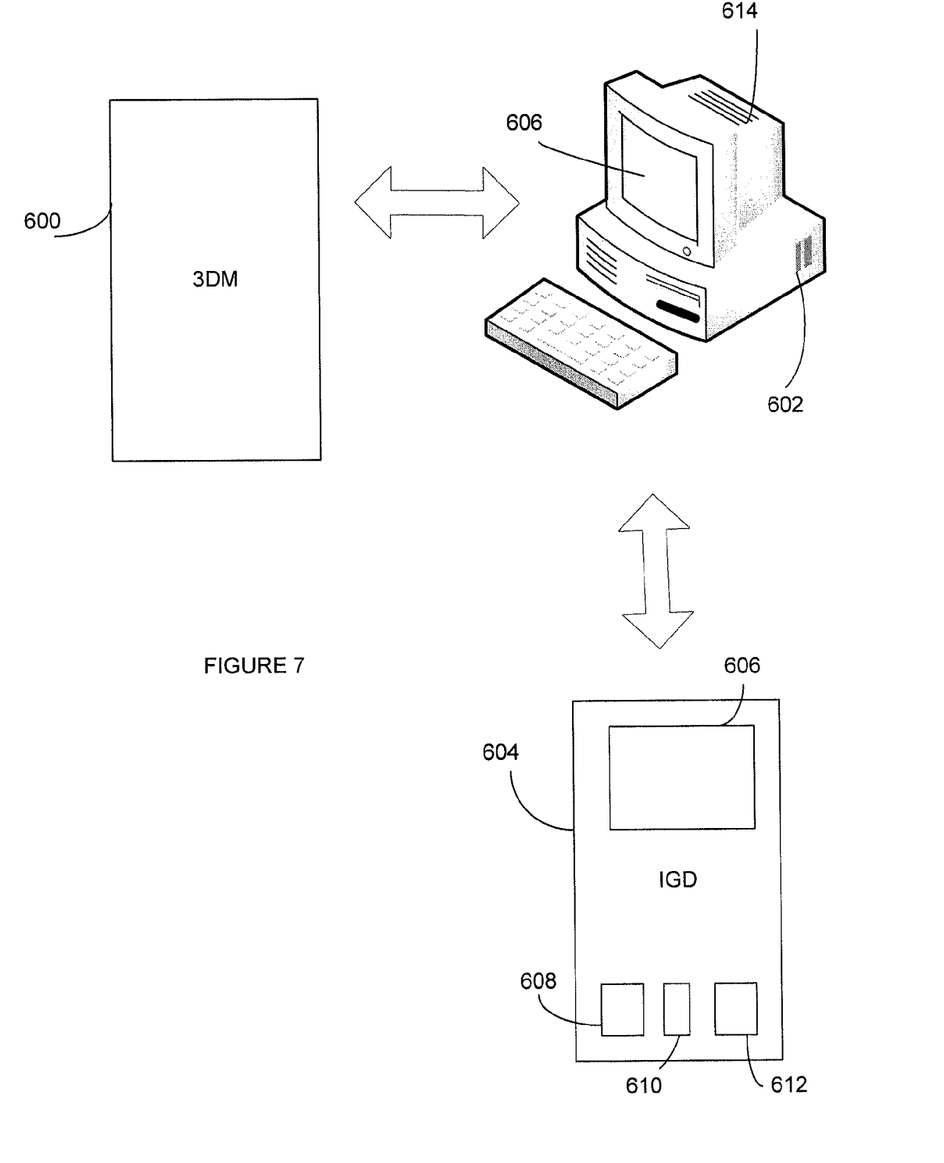
FIG. 7 is a block diagram of a system for synchronizing a 3DM and an IGD where a separate computing device is used for one of the transformation modules, in accordance with one embodiment.

FIG. 7 illustrates a second embodiment of the system for synchronizing the IGD 604 and the 3DM 600. In this case, one of the transformation modules, namely the 3DM transformation module 602 is on a computing device 614 separate from the 3DM 600. Alternatively, the transformation module on the computing device 614 may be the IGD transformation module 610 while the 3DM transformation module 602 is integrated in the 3DM 600, as per FIG. 6.

In this embodiment, the computing device 614 has a display device 606. The computing device 614 may be a Personal Computer (PC), a laptop, a Personal Digital Assistant (PDA), or any other programmable machine that can store, retrieve, and process data and therefore includes at least one Central Processing Unit (CPU) that performs most calculations and includes a main memory, a control unit, and an arithmetic logic unit. Communications, wireless or connected, may occur between the 3DM 600 and the computing device 614, and between the computing device 614 and the IGD 604.

Figure 8:
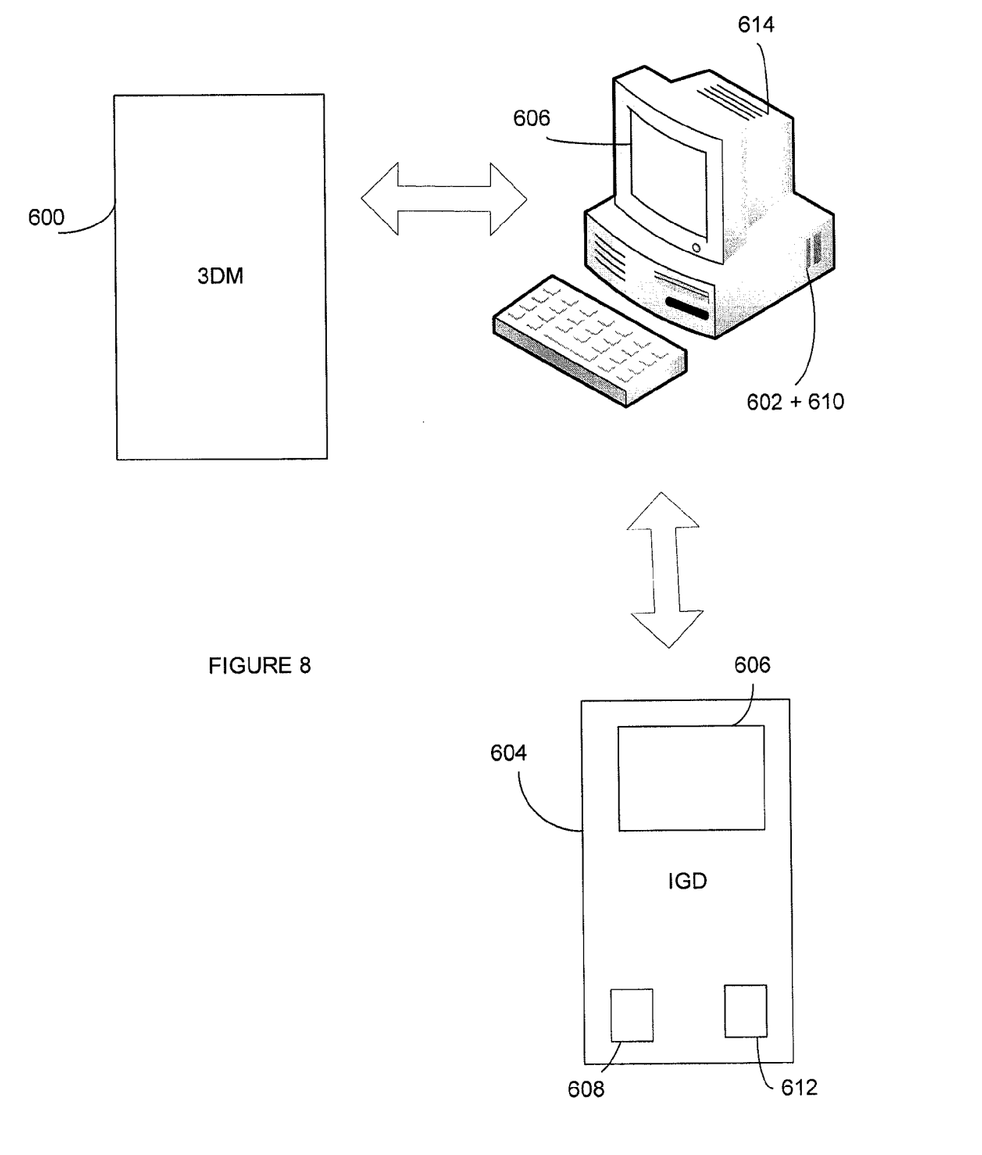
FIG. 8 is a block diagram of a system for synchronizing a 3DM and an IGD where a separate computing device is used for both of the transformation modules, in accordance with one embodiment.

FIG. 8 illustrates a third embodiment of the system for synchronizing the IGD 604 and the 3DM 600. In this case, both of the transformation modules 602 and 610 are present on the separate computing device 614. It should be understood that the computing device 614 may be made up of one or more computers, or a network of computers, and is adapted to be in communication with the IGD 604 and the 3DM 600.

Other devices, besides the iPhone™ may be used as an IGD. For example, the iPod Touch™ and the Nexus One™ also include all of the elements of an IGD. Any devices which have a display device, a gravity direction measurement device, and an electronic compass may be used. Examples of 3DM devices are the FaroArm™, the PCMM from Romer, and the Leica Absolute Tracker™.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present invention can be carried out as a method, can be embodied in a system, a computer readable medium or an electrical or electro-magnetic signal. If embodied on a computer-readable medium, it may be embodied as computer-executable instructions encoded on at least one non-transitory, tangible computer storage medium. The embodiments of the invention described above are intended to be exemplary only. The scope of the invention is therefore intended to be limited solely by the scope of the appended claims.

The invention claimed is:

1. A method for synchronizing a three-dimensional measurement device (3DM) having an internal 3D coordinate system $O_{3DM}$, $X_{3DM}$, $Y_{3DM}$, and $Z_{3DM}$, with an intelligent guidance device (IGD) separate from the 3DM, the IGD having a display device, a gravity direction measurement device, an electronic compass, and an internal 3D coordinate system $O_{IGD}$, $X_{IGD}$, $Y_{IGD}$, $Z_{IGD}$, the method comprising:
    defining a coordinate system $O_{IGD\text{-}Earth}$, $X_{IGD\text{-}Earth}$, $Y_{IGD\text{-}Earth}$, $Z_{IGD\text{-}Earth}$ using a direction opposite to gravity as $Z_{IGD\text{-}Earth}$ and a direction corresponding to a magnetic north pole as $Y_{IGD\text{-}Earth}$, from a perspective of the IGD by:
        measuring a direction of gravity using the gravity direction measurement device and defining a vector $Z_{IGD\text{-}Earth}$ as opposite to the direction of gravity;
        measuring a direction of North magnetic pole using the electronic compass and defining a vector $Y_{IGD\text{-}Earth}$ pointing in the North magnetic pole direction; and
        computing a vector product of $Y_{IGD\text{-}Earth}$ and $Z_{IGD\text{-}Earth}$ defining vector $X_{IGD\text{-}Earth}$;
    computing and applying a rigid transformation $T_{IGD\text{-}To\text{-}IGDEarth}$ to transform $O_{IGD}$, $X_{IGD}$, $Y_{IGD}$, $Z_{IGD}$ to $O_{IGD\text{-}Earth}$, $X_{IGD\text{-}Earth}$, $Y_{IGD\text{-}Earth}$, $Z_{IGD\text{-}Earth}$;
    defining a coordinate system $O_{3DM\text{-}Earth}$, $X_{3DM\text{-}Earth}$, $Y_{3DM\text{-}Earth}$, $Z_{3DM\text{-}Earth}$ using a direction opposite to gravity as $Z_{3DM\text{-}Earth}$ and the direction corresponding to the magnetic north pole as $Y_{3DM\text{-}Earth}$, from a perspective of the 3DM; and
    computing and applying a rigid transformation $T_{3DM\text{-}To\text{-}3DMEarth}$ to transform $O_{3DM}$, $X_{3DM}$, $Y_{3DM}$, and $Z_{3DM}$ to $O_{3DM\text{-}Earth}$, $X_{3DM\text{-}Earth}$, $Y_{3DM\text{-}Earth}$, $Z_{3DM\text{-}Earth}$, such that $X_{IGD\text{-}Earth}$ and $X_{3DM\text{-}Earth}$ are substantially parallel and point in a first direction, $Y_{IGD\text{-}Earth}$ and $Y_{3DM\text{-}Earth}$ are substantially parallel and point in a second direction, and $Z_{IGD\text{-}Earth}$ and $Z_{3DM\text{-}Earth}$ are substantially parallel and point in a third direction, thereby synchronizing an orientation of the IGD with an orientation of the 3DM.

2. The method of claim 1, wherein defining a coordinate system $O_{3DM\text{-}Earth}$, $X_{3DM\text{-}Earth}$, $Y_{3DM\text{-}Earth}$, $Z_{3DM\text{-}Earth}$ comprises:
    measuring a direction of gravity using the gravity direction measurement device and defining a vector $Z_{3DM\text{-}Earth}$ as opposite to the direction of gravity;
    measuring a direction of North magnetic pole using the electronic compass and defining a vector $Y_{3DM\text{-}Earth}$ pointing in the North magnetic pole direction; and
    computing a vector product of $Y_{3DM\text{-}Earth}$ and $Z_{3DM\text{-}Earth}$ defining vector $X_{3DM\text{-}Earth}$.

3. The method of claim 2, wherein measuring a direction of gravity from a perspective of the 3DM comprises using a gravity direction measurement device integrated in the 3DM to determine the direction of gravity.

4. The method of claim 2, wherein measuring a direction of the north magnetic pole from a perspective of the 3DM comprises using an electronic compass integrated in the 3DM.

5. The method of claim 1, further comprising defining a plane formed by $Z_{IGD\text{-}Earth}$ and $Y_{IGD\text{-}Earth}$, and rotating one of $Y_{IGD\text{-}Earth}$ and $Z_{IGD\text{-}Earth}$ to make $Z_{IGD\text{-}Earth}$ and $Y_{IGD\text{-}Earth}$ perpendicular to each other.

6. The method of claim 4, wherein rotating one of $Y_{IGD\text{-}Earth}$ and $Z_{IGD\text{-}Earth}$ comprises using a smallest available positive angle of rotation.

7. The method of claim 1, further comprising defining a plane formed by $Z_{3DM\text{-}Earth}$ and $Y_{3DM\text{-}Earth}$, and rotating one of $Y_{3DM\text{-}Earth}$ and $Z_{3DM\text{-}Earth}$ to make $Z_{3DM\text{-}Earth}$ and $Y_{3DM\text{-}Earth}$ perpendicular to each other.

8. The method of claim 7, wherein rotating one of $Y_{3DM\text{-}Earth}$ and $Z_{3DM\text{-}Earth}$ comprises using a smallest available positive angle of rotation.

9. The method of claim 1, further comprising:
    monitoring a change in orientation of the IGD; and
    when a change is detected, updating the rigid transformation $T_{IGD\text{-}To\text{-}IGDEarth}$ by re-measuring gravity and north magnetic pole and re-applying the rigid transformation.

10. The method of claim 1, further comprising maintaining the synchronization of the 3DM and the IGD by:
    applying an invert of the rigid transformation $Y_{3DM\text{-}To\text{-}3DMEarth}$ to the 3D coordinate system $O_{IGD\text{-}Earth}$, $X_{IGD\text{-}Earth}$, $Y_{IGD\text{-}Earth}$, $Z_{IGD\text{-}Earth}$ and to the 3D coordinate system $O_{3DM\text{-}Earth}$, $X_{3DM\text{-}Earth}$, $Y_{3DM\text{-}Earth}$, $Z_{3DM\text{-}Earth}$; and
    determining a new rigid 3D transformation transforming the internal 3DM coordinate system into another 3D coordinate system and applying the new rigid 3D transformation to the IGD coordinate system and the 3DM coordinate system.

11. A system for synchronizing a three-dimensional measurement device (3DM) having an internal 3D coordinate system $O_{3DM}$, $X_{3DM}$, $Y_{3DM}$, and $Z_{3DM}$, with an intelligent guidance device (IGD) separate from the 3DM, the IGD having a display device, a gravity direction measurement device, an electronic compass, and an internal 3D coordinate system $O_{IGD}$, $X_{IGD}$, $Y_{IGD}$, $Z_{IGD}$, the system comprising:
    an IGD transformation module operatively connected to the IGD and adapted to define a coordinate system $O_{IGD\text{-}Earth}$, $X_{IGD\text{-}Earth}$, $Y_{IGD\text{-}Earth}$, $Z_{IGD\text{-}Earth}$ using a direction opposite to gravity as $Z_{IGD\text{-}Earth}$ as measured by the gravity direction measurement device and a direction corresponding to a magnetic north pole as $Y_{IGD\text{-}Earth}$ as measured by the electronic compass, from a perspective of the IGD, and compute and apply a rigid transformation $T_{IGD\text{-}To\text{-}IGDEarth}$ to transform $O_{IGD}$, $X_{IGD}$, $Y_{IGD}$, $Z_{IGD}$ to $O_{IGD\text{-}Earth}$, $X_{IGD\text{-}Earth}$, $Y_{IGD\text{-}Earth}$, $Z_{IGD\text{-}Earth}$ at least in part by computing a vector product of $Y_{IGD\text{-}Earth}$ and $Z_{IGD\text{-}Earth}$ to define vector $X_{IGD\text{-}Earth}$; and
    a 3DM transformation module operatively connected to the 3DM and adapted to define a coordinate system $O_{3DM\text{-}Earth}$, $X_{3DM\text{-}Earth}$, $Y_{3DM\text{-}Earth}$, $Z_{3DM\text{-}Earth}$ using a direction opposite to gravity as $Z_{3DM\text{-}Earth}$ and the direction corresponding to the magnetic north pole as $Y_{3DM\text{-}Earth}$, from a perspective of the 3DM, compute and apply a rigid transformation $T_{3DM\text{-}To\text{-}3DMEarth}$ to transform $O_{3DM}$, $X_{3DM}$, $Y_{3DM}$, and $Z_{3DM}$ to $O_{3DM\text{-}Earth}$, $X_{3DM\text{-}Earth}$, $Y_{3DM\text{-}Earth}$, $Z_{3DM\text{-}Earth}$, such that $X_{IGD\text{-}Earth}$ and $X_{3DM\text{-}Earth}$ are substantially parallel and point in a first direction, $Z_{IGD\text{-}Earth}$ and $Y_{3DM\text{-}Earth}$ are substantially parallel and point in a second direction, and $Z_{IGD\text{-}Earth}$ and $Z_{3DM\text{-}Earth}$ are substantially parallel and point in a third direction, thereby synchronizing an orientation of the IGD with an orientation of the 3DM.

12. The system of claim 11, wherein the IGD transformation module is integrated inside the IGD.

13. The system of claim 11, wherein the 3DM transformation module is integrated inside the 3DM.

14. An intelligent guidance device having an internal 3D coordinate system $O_{IGD}$, $X_{IGD}$, $Y_{IGD}$, $Z_{IGD}$, the device comprising:
- a gravity direction measurement device;
- an electronic compass;
- an IGD transformation module operatively connected to the IGD and adapted to define a coordinate system $O_{IGD\text{-}Earth}$, $X_{IGD\text{-}Earth}$, $Y_{IGD\text{-}Earth}$, $Z_{IGD\text{-}Earth}$ using a direction opposite to gravity as $Z_{IGD\text{-}Earth}$ as measured by the gravity direction measurement device and a direction corresponding to a magnetic north pole as $Y_{IGD\text{-}Earth}$ as measured by the electronic compass, and to compute and apply a rigid transformation $T_{IGD\text{-}To\text{-}IGDEarth}$ to transform $O_{IGD}$, $X_{IGD}$, $Y_{IGD}$, $Z_{IGD}$ to $O_{IGD\text{-}Earth}$, $X_{IGD\text{-}Earth}$, $Y_{IGD\text{-}Earth}$, $Z_{IGD\text{-}Earth}$ at least in part by computing a vector product of $Y_{IGD\text{-}Earth}$ And $Z_{IGD\text{-}Earth}$ to define vector $X_{IGD\text{-}Earth}$; and
- a display device for displaying 3D graphics in a 3D coordinate system synchronized with a 3D coordinate system of a three-dimensional measurement device separate from the intelligent guidance device.

15. A 3D graphics measurement and display system comprising:
- a three-dimensional measurement device (3DM) having an internal 3D coordinate system $O_{3DM}$, $X_{3DM}$, $Y_{3DM}$, and $Z_{3DM}$;
- a 3DM transformation module operatively connected to the 3DM and adapted to define a coordinate system $O_{3DM\text{-}Earth}$, $X_{3DM\text{-}Earth}$, $Y_{3DM\text{-}Earth}$, $Z_{3DM\text{-}Earth}$, using a direction opposite to gravity as $Z_{3DM\text{-}Earth}$ and the direction corresponding to the magnetic north pole as $Y_{3DM\text{-}Earth}$, from a perspective of the 3DM, compute and apply a rigid transformation $T_{3DM\text{-}To\text{-}3DMEarth}$ to transform $O_{3DM}$, $X_{3DM}$, $Y_{3DM}$, and $Z_{3DM}$ to $O_{3DM\text{-}Earth}$, $X_{3DM\text{-}Earth}$, $Y_{3DM\text{-}Earth}$, $Z_{3DM\text{-}Earth}$;
- an intelligent guidance device (IGD) separate from the 3DM, the IGD having an internal 3D coordinate system $O_{IGD}$, $X_{IGD}$, $Y_{IGD}$, $Z_{IGD}$;
- a gravity direction measurement device integrated in the IGD;
- an electronic compass integrated in the IGD;
- an IGD transformation module operatively connected to the IGD and adapted to define a coordinate system $O_{IGD\text{-}Earth}$, $X_{IGD\text{-}Earth}$, $Y_{IGD\text{-}Earth}$, $Z_{IGD\text{-}Earth}$ using a direction opposite to gravity as $Z_{IGD\text{-}Earth}$ as measured by the gravity direction measurement device and a direction corresponding to a magnetic north pole as $Y_{IGD\text{-}Earth}$ as measured by the electronic compass, and to compute and apply a rigid transformation $T_{IGD\text{-}To\text{-}IGDEarth}$ to transform $O_{IGD}$, $X_{IGD}$, $Y_{IGD}$, $Z_{IGD}$ to $O_{IGD\text{-}Earth}$, $X_{IGD\text{-}Earth}$, $Y_{IGD\text{-}Earth}$, $Z_{IGD\text{-}Earth}$, at least in part by computing a vector product of $Y_{IGD\text{-}Earth}$ and $Z_{IGD\text{-}Earth}$ to define vector $X_{IGD\text{-}Earth}$ and such that $X_{IGD\text{-}Earth}$ and $X_{3DM\text{-}Earth}$ are substantially parallel and point in a first direction, $Y_{IGD\text{-}Earth}$ and $Y_{3DM\text{-}Earth}$ are substantially parallel and point in a second direction, and $Z_{IGD\text{-}Earth}$ and $Z_{3DM\text{-}Earth}$ are substantially parallel and point in a third direction, thereby synchronizing an orientation of the IGD with an orientation of the 3DM; and
- a display device on the IGD for displaying 3D graphics in a 3D coordinate system synchronized with a 3D coordinate system of a three-dimensional measurement device.

16. A non-transitory computer readable memory having recorded thereon statements and instructions for execution by a computer to carry out a method for synchronizing a three-dimensional measurement device (3DM) having an internal 3D coordinate system $O_{3DM}$, $X_{3DM}$, $Y_{3DM}$, and $Z_{3DM}$, with an intelligent guidance device (IGD) separate from the 3DM, the IGD having a display device, a gravity direction measurement device, an electronic compass, and an internal 3D coordinate system $O_{IGD}$, $X_{IGD}$, $Y_{IGD}$, $Z_{IGD}$, the statements and instructions being directed to:
- defining a coordinate system $O_{IGD\text{-}Earth}$, $X_{IGD\text{-}Earth}$, $Y_{IGD\text{-}Earth}$, $Z_{IGD\text{-}Earth}$ using a direction opposite to gravity as $Z_{IGD\text{-}Earth}$ and a direction corresponding to a magnetic north pole as $Y_{IGD\text{-}Earth}$, from a perspective of the IGD by:
  - measuring a direction of gravity using the gravity direction measurement device and defining a vector $Z_{IGD\text{-}Earth}$ as opposite to the direction of gravity:,
  - measuring a direction of North magnetic pole using the electronic compass and defining a vector $Y_{IGD\text{-}Earth}$ pointing in the North magnetic pole direction; and
  - computing a vector product of $Y_{IGD\text{-}Earth}$ and $Z_{IGD\text{-}Earth}$ defining vertor $X_{IGD\text{-}Earth}$;
- computing and applying a rigid transformation $T_{IGD\text{-}To\text{-}IGDEarth}$ to transform $O_{IGD}$, $X_{IGD}$, $Y_{IGD}$, $Z_{IGD}$ to $O_{IGD\text{-}Earth}$, $X_{IGD\text{-}Earth}$, $Y_{IGD\text{-}Earth}$, $Z_{IGDEarth}$;
- defining a coordinate system $O_{3DM\text{-}Earth}$, $X_{3DM\text{-}Earth}$, $Y_{3DM\text{-}Earth}$, $Z_{3DM\text{-}Earth}$ using a direction opposite to gravity as $Z_{3DM\text{-}Earth}$ and the direction corresponding to the magnetic north pole as $Y_{3DM\text{-}Earth}$, from a perspective of the 3DM; and
- computing and applying a rigid transformation $T_{3DM\text{-}To\text{-}3DMEarth}$ to transform $O_{3DM}$, $X_{3DM}$, $Y_{3DM}$, and $Z_{3DM}$ to $O_{3DM\text{-}Earth}$, $X_{3DM\text{-}Earth}$, $Y_{3D\text{-}Earth}$, $Z_{3DM\text{-}Earth}$, such that $X_{IGD\text{-}Earth}$ and $X_{3DM\text{-}Earth}$ are substantially parallel and point in a first direction, $Y_{IGD\text{-}Earth}$ and $Y_{3DM\text{-}Earth}$ are substantially parallel and point in a second direction, and $Z_{IGD\text{-}Earth}$ and $Z_{3DM\text{-}Earth}$ are substantially parallel and point in a third direction, thereby synchronizing an orientation of the IGD with an orientation of the 3DM.

* * * * *